United States Patent
Hare et al.

(10) Patent No.: US 11,989,739 B2
(45) Date of Patent: May 21, 2024

(54) SYSTEM AND METHOD FOR IDENTITY VERIFICATION

(71) Applicant: Apple Inc., Cupertino, CA (US)

(72) Inventors: Peter J. Hare, San Francisco, CA (US); David G. Knipp, San Jose, CA (US); Natalie Calvert, Santa Clara, CA (US); Bagath S. Pugazhendhi, San Jose, CA (US); Patrick J. Rogers, San Leandro, CA (US); Kalyan C. Gopavarapu, Sunnyvale, CA (US); Kashyap Jogi, Milpitas, CA (US); Sivasankar Ponnambalam, Santa Clara, CA (US); Nora J. Shoemaker, Mountain View, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/071,159

(22) Filed: Oct. 15, 2020

(65) Prior Publication Data
US 2021/0398145 A1     Dec. 23, 2021

Related U.S. Application Data

(60) Provisional application No. 63/041,750, filed on Jun. 19, 2020.

(51) Int. Cl.
*G06Q 30/00* (2023.01)
*G06Q 20/12* (2012.01)
(Continued)

(52) U.S. Cl.
CPC ..... *G06Q 30/0185* (2013.01); *G06Q 20/1235* (2013.01); *G06Q 20/40145* (2013.01);
(Continued)

(58) Field of Classification Search
CPC .................................................. G06Q 30/0185
(Continued)

(56) References Cited

U.S. PATENT DOCUMENTS 8,812,395 B2    8/2014  Webber et al.
9,390,415 B2 *  7/2016  Hanson ............ G06Q 20/3278
(Continued)

OTHER PUBLICATIONS

"State of the Art: Secure Mobile Payment" IEEE (Year: 2019).*
(Continued)

*Primary Examiner* — Bruce I Ebersman
(74) *Attorney, Agent, or Firm* — DICKINSON WRIGHT RLLP

(57) ABSTRACT

Representative embodiments set forth techniques for verifying an identity of a primary user of a primary account on a client device. A method may include receiving, for the primary account, a request for identity verification responsive to an action of a secondary account associated with the primary account and identifying a payment registration characteristic of a payment registration associated with the primary account. The method also includes retrieving identity information associated with the primary account based on the payment registration characteristic and, in response to a determination that the identity information corresponds to a verification indicator, verifying an identity of a user of the primary account. The method also includes, in response to verifying the identity of the user of the primary account, generating a payment verification token and associating the payment verification token with an authorization indication for the action of the secondary account.

20 Claims, 10 Drawing Sheets

(51) Int. Cl.
  *G06Q 20/40* (2012.01)
  *G06Q 30/018* (2023.01)
  *H04L 9/40* (2022.01)
  *G06Q 20/36* (2012.01)
(52) U.S. Cl.
  CPC ...... *H04L 63/0853* (2013.01); *H04L 63/0861* (2013.01); *G06Q 20/3674* (2013.01); *G06Q 20/4018* (2013.01)
(58) Field of Classification Search
  USPC .......................................................... 705/44
  See application file for complete search history.

(56) References Cited

U.S. PATENT DOCUMENTS

| | | | |
|---|---|---|---|
| 9,547,862 B2 | 1/2017 | Akin | |
| 10,679,214 B2* | 6/2020 | Good | H04L 63/062 |
| 10,764,752 B1* | 9/2020 | Avetisov | H04W 12/08 |
| 10,853,791 B1* | 12/2020 | Ellis | G06Q 20/3676 |
| 10,929,841 B1* | 2/2021 | Kalaboukis | G06Q 20/322 |
| 11,341,523 B1* | 5/2022 | Jacoby | G06Q 20/20 |
| 2003/0158960 A1* | 8/2003 | Engberg | G06Q 30/06 |
| | | | 709/228 |
| 2006/0144925 A1* | 7/2006 | Jones | G06Q 30/00 |
| | | | 235/379 |
| 2007/0244811 A1* | 10/2007 | Tumminaro | G06Q 20/223 |
| | | | 705/39 |
| 2008/0288405 A1* | 11/2008 | John | G06Q 20/384 |
| | | | 705/44 |
| 2009/0119190 A1* | 5/2009 | Realini | G06Q 20/3265 |
| | | | 705/37 |
| 2011/0125645 A1 | 5/2011 | Benkert et al. | |
| 2015/0186892 A1* | 7/2015 | Zhang | G06Q 20/326 |
| | | | 705/44 |
| 2015/0220933 A1* | 8/2015 | Li | G06Q 20/40145 |
| | | | 705/44 |
| 2015/0326550 A1 | 11/2015 | Schropfer et al. | |
| 2016/0210626 A1* | 7/2016 | Ortiz | G06Q 20/023 |
| 2016/0277380 A1* | 9/2016 | Wagner | H04W 12/069 |
| 2017/0017958 A1* | 1/2017 | Scott | G06Q 20/40 |
| 2017/0061466 A1* | 3/2017 | Srivastava | G06Q 30/0238 |
| 2018/0181964 A1* | 6/2018 | Zagarese | G06Q 20/40145 |
| 2018/0253727 A1* | 9/2018 | Ortiz | G06Q 20/023 |
| 2018/0293573 A1* | 10/2018 | Ortiz | G06Q 20/102 |
| 2019/0297671 A1* | 9/2019 | Perdomo | H04L 41/082 |
| 2020/0372495 A1* | 11/2020 | Maheshwari | G06Q 20/3678 |
| 2020/0394621 A1* | 12/2020 | Lakshmanan | G06Q 20/367 |
| 2021/0044976 A1* | 2/2021 | Avetisov | G06F 21/64 |
| 2021/0158384 A1* | 5/2021 | Mimassi | G06Q 10/02 |
| 2021/0182863 A1* | 6/2021 | Doraiswamy | G06Q 20/02 |

OTHER PUBLICATIONS

"Selfi's: Self-Sovereign Biometric ID's" IEEE (Year: 2019).*
A Survey on Identity Management for the Future Network IEEE 2013 (Year: 2013).*
Secure E-Payment Method Based on Visual Cryptography, IEEE 2018 (Year: 2018).*
Authentication at Scale, IEEE 2013 (Year: 2013).*

* cited by examiner

SYSTEM AND METHOD FOR IDENTITY VERIFICATION

CROSS-REFERENCE TO RELATED APPLICATIONS

The present application claims the benefit of U.S. Provisional Application No. 63/041,750, entitled "SYSTEM AND METHOD FOR IDENTITY VERIFICATION," filed Jun. 19, 2020, the content of which is incorporated herein by reference in its entirety for all purposes.

FIELD

The described embodiments relate generally to account verification, and in particular to systems and methods for verifying an identity of a user of a primary account based on an action taken by a secondary account.

BACKGROUND

A long-standing challenge in human-computer interaction is to streamline in application user verification by reducing or eliminating the need for the user to leave the application to provide sufficient verification credentials. In practice, users typically interact with an application to, for example, set up a user account, which may require the user to provide various credentials to verify the identity of the user. This may make interacting with the application cumbersome and/or difficult to use.

SUMMARY

In view of the challenges in user identity verification for mobile device users, one or more embodiments described herein include systems and methods that verify the identity of the user while interacting with an application.

Accordingly, one embodiment sets forth a method for providing identity verification includes, at a client device receiving, for a primary account associated with the client device, a request for identity verification responsive to an action of a secondary account associated with the primary account and identifying a payment registration characteristic of a payment registration associated with the primary account. The method also includes retrieving identity information associated with the primary account based on the payment registration characteristic and, in response to a determination that the identity information corresponds to a verification indicator, verifying an identity of a user of the primary account. The method also includes, in response to verifying the identity of the user of the primary account, generating a payment verification token, and associating the payment verification token with an authorization indication for the action of the secondary account.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings, which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1A:
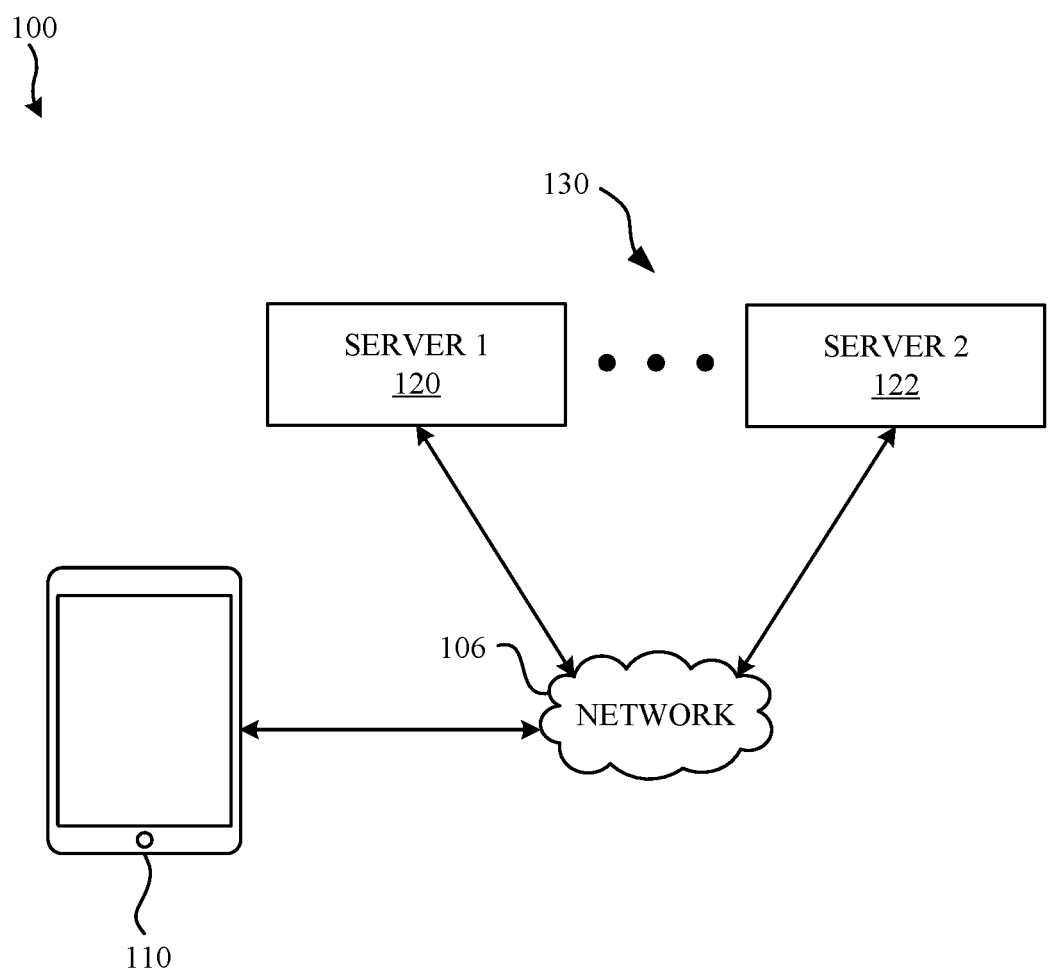
FIGS. 1A-1E illustrate an example network environment including an electronic device that may implement the subject system, according to some embodiments.

Representative applications of methods and apparatus according to the present application are described in this section. These examples are being provided solely to add context and aid in the understanding of the described embodiments. It will thus be apparent to one skilled in the art that the described embodiments can be practiced without some or all these specific details. In other instances, well-known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in enough detail to enable one skilled in the art to practice the described embodiments, it is understood that these examples are not limiting such that other embodiments can be used, and changes can be made without departing from the spirit and scope of the described embodiments.

As described, a long-standing challenge in human-computer interaction is to streamline in application user verification by reducing or eliminating the need for the user to leave the application to provide sufficient verification credentials. In practice, users typically interact with an application to, for example, set up a user account, which may require the user to provide various credentials to verify the identity of the user. This may make interacting with the application cumbersome and/or difficult to use.

Typically, the user of a mobile device creates a user account for interacting with various applications, tools, systems, or other aspects of the mobile device. The user account may be characterized by information corresponding to the user. For example, the user account may include a user profile indicating a user name, a user password, a user home address, a user electronic mail address, other suitable information, or a combination thereof. In addition to such information, the user may provide account information and credentials for a payment instrument, such as a credit card, a bank account, and the like, for use in purchasing in application content, shopping online, and the like. With the recent use of biometric information to access various aspects of the mobile device, the user typically includes one or more biometric credentials for use in, for example, accessing the mobile device, making in application purchases, shopping online, and the like.

As mobile devices continue to become ubiquitous among users of all age groups, it is becoming increasingly more common for members of the same family to share purchases, application information, and other aspects of various mobile devices using a shared family account. For example, the user of the mobile device (e.g., which may be referred to as the primary user) may create a family account that includes the user account associated with the user as a primary account while adding various secondary accounts to the family account. The secondary accounts may correspond to other family members or other people associated with the primary user. For example, the primary user may include an adult, parent, guardian, and the like, while the secondary accounts may correspond to children, spouses, other family members, friends, and the like.

Typically, when the primary user creates a secondary account for a child, one or more identity verification techniques may be used to verify that the user attempting to create the account is the primary user. For example, the primary user may interact with a user account setup application configured to allow the primary user to create secondary accounts on the family account. The setup application may gather various information from the primary user regarding the secondary account, such as a user name associated with the secondary account, a user password (e.g., at least an initial password) associated with the secondary user account, an identity of the user associated with the secondary account, an age of the user associated with the secondary account, other suitable information, or a combination thereof. Typically, when the age of the user associated with the secondary account is at or below a threshold age (e.g., 13 years old or any suitable threshold age), the setup application will require the primary user to verify the identity of the primary user in order to proceed with the secondary account setup (e.g., to ensure that the primary user, typically an adult, such as a parent, guardian, and the like, is performing the account setup).

In addition to creating secondary accounts, the primary user may monitor and/or manage actions taken by the secondary accounts during use of the mobile device, other mobile devices, or other computing devices associated with the secondary accounts. For example, the primary user may approve application purchases and downloads, content purchases, content access (e.g., such as video streaming, music streaming, online gaming, and the like), and so on. As described, when the age of the user associated with a secondary account is at or below the threshold age, the primary user may be required to provide verification of the identity of the primary user before allowing the primary user to approve an action taken by the secondary account.

Such identity verification typically requires the primary user to move from one application to another in order to provide verification credentials to verify the identity of the primary user. For example, during the creation of a secondary account, the primary user may leave the account setup application to interact with one or more verification applications. Similarly, when the primary user is asked to approve an action taken by the user associated with the secondary account, the primary user, depending on the type of action being taken, may leave the approval application to interact with the various verification applications. This may be burdensome for the primary user and may lead to security concerns on behalf of the primary user (e.g. due to leaving an application to interact with another application requesting sensitive or private information).

Accordingly, systems and methods, such as those described herein, that provide for in application user identity verification, may be desirable. In some embodiments, the systems and methods described herein may be configured to receive, for a primary account associated with the client device, a request for identity verification responsive to an action of a secondary account associated with the primary account. The systems and methods described herein may be configured to identify a payment registration characteristic of a payment registration associated with the primary account. The systems and methods described herein may be configured to retrieve identity information associated with the primary account based on the payment registration characteristic.

The systems and methods described herein may be configured to determine a payment registration type based on the payment registration characteristic. The systems and methods described herein may be configured to, in response to the payment registration characteristic indicating that the primary account includes a first type of payment registration, generate a verification indicator. When the payment registration characteristic indicates that the primary account includes the first type of payment registration, the verification indicator includes at least one biometric challenge and the identity information includes a biometric information.

The systems and methods described herein may be configured to determine whether the payment registration characteristic indicates that the primary account includes a second type of payment registration, in response to a determination that the primary account does not include the first type of payment registration. In response to a determination that the primary account includes the second type of payment registration, the systems and methods described herein may be configured to, receive, from a server associated the payment registration, the verification indicator. When the primary account includes the second type of payment registration, the verification indicator includes at least one biometric challenge and the identity information includes a biometric information.

The systems and methods described herein may be configured to determine whether the payment registration characteristic indicates that the primary account includes a third type of payment registration, in response to a determination that the primary account does not include the second type (e.g., or the first type) of payment registration. In response to a determination that the primary account include the third type of payment registration, the systems and methods described herein may be configured to, receive, from a server associated the payment registration, the verification indicator. When the primary account includes the third type of payment registration, the verification indicator includes at least one verification question and the identity information includes a verification information responsive to the verification question.

The systems and methods described herein may be configured to, in response to a determination that the identity information corresponds to the verification indicator, verifying an identity of the user of the primary account. The systems and methods described herein may be configured to, in response to verifying the identity of the user of the primary account, generate a payment verification token. The payment verification token may indicate that the identity of the user has been verified. The systems and methods described herein may be configured to associate the payment verification token with an authorization indication for the action of the secondary account. The systems and methods described herein may be configured to store the payment verification and the associated authorization indication. The authorization indication may indicate that the payment verification toke indicates that the identity of the user of the primary account has been identified and that the action of the secondary account was approved by the user of the primary account. The systems and methods described herein may be configure to continue performing the action of the secondary account.

FIG. 1A illustrates an example network environment 100 including an electronic device 110 that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes the electronic device 110, a server 120, and a server 122 in which the server 120 and/or the server 122 may be included in a group of servers 130. The network 106 may communicatively (directly or indirectly) couple, for example, the electronic device 110 with the server 120 and/or the server 122 and/or the group of servers 130. In one or more implementations, the network 106 may be an interconnected network of devices that may include, or may be communicatively coupled to, the Internet. For explanatory purposes, the network environment 100 is illustrated in FIG. 1 as including the electronic device 110, the server 120, the server 122, and the group of servers 130; however, the network environment 100 may include any number of electronic devices and any number of servers or a data center including multiple servers.

The electronic device 110 may include a touchscreen and may be, for example, a portable computing device such as a laptop computer that includes a touchscreen, a smartphone that includes a touchscreen, a peripheral device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In one or more implementations, the electronic device 110 may not include a touchscreen but may support touchscreen-like gestures, such as in a virtual reality or augmented reality environment. In one or more implementations, the electronic device 110 may include a touchpad. In FIG. 1A, by way of example, the electronic device 110 is depicted as a mobile computing device with a touchscreen. In one or more implementations, the electronic device 110 may be, and/or may include all or part of, the electronic system discussed below with respect to FIG. 6.

The server 120 and/or the server 122 may be part of a network of computers or the group of servers 130, such as in a cloud computing or data center implementation. The server 120, the server 122, and/or the group of servers 130 may store data or data collections, such as photos, music, text, web pages and/or content provided therein, etc., that may be accessible on the electronic device 110. In one or more implementations, the electronic device 110 may support a UI operation that involves a representation of a data collection that is partially physically stored on the electronic device 110 and partially physically stored on the server 120, the server 122, and/or one or more servers from the group of servers 130, such as an image file, text, sound file, a video file, an application, etc. For example, the electronic device 110 may be configured to generate a visual representation of a data collection, using the UI operation. Additionally, or alternatively, the electronic device 110 may be configured to generate a visual animation of the data collection transitioning from a current view to a future view.

In some embodiments, at least one of the group of servers 130, such as the server 120, may be configured to provide various identity management services, product management services, financial verification services, other suitable services, or a combination thereof. For example, a user, such as the primary user, may interact with the electronic device 110 to access the primary account. The primary user may access one or more applications associated with the primary account that require identity verification, financial instrument verification, and/or other services that may be provided by the server 120. It should be understood that any suitable server other than the server 120 may perform the services described herein. Additionally, or alternatively, additional servers may cooperate with the server 120 and/or work independently of the server 120 to provide the services described herein.

Figure 1B:
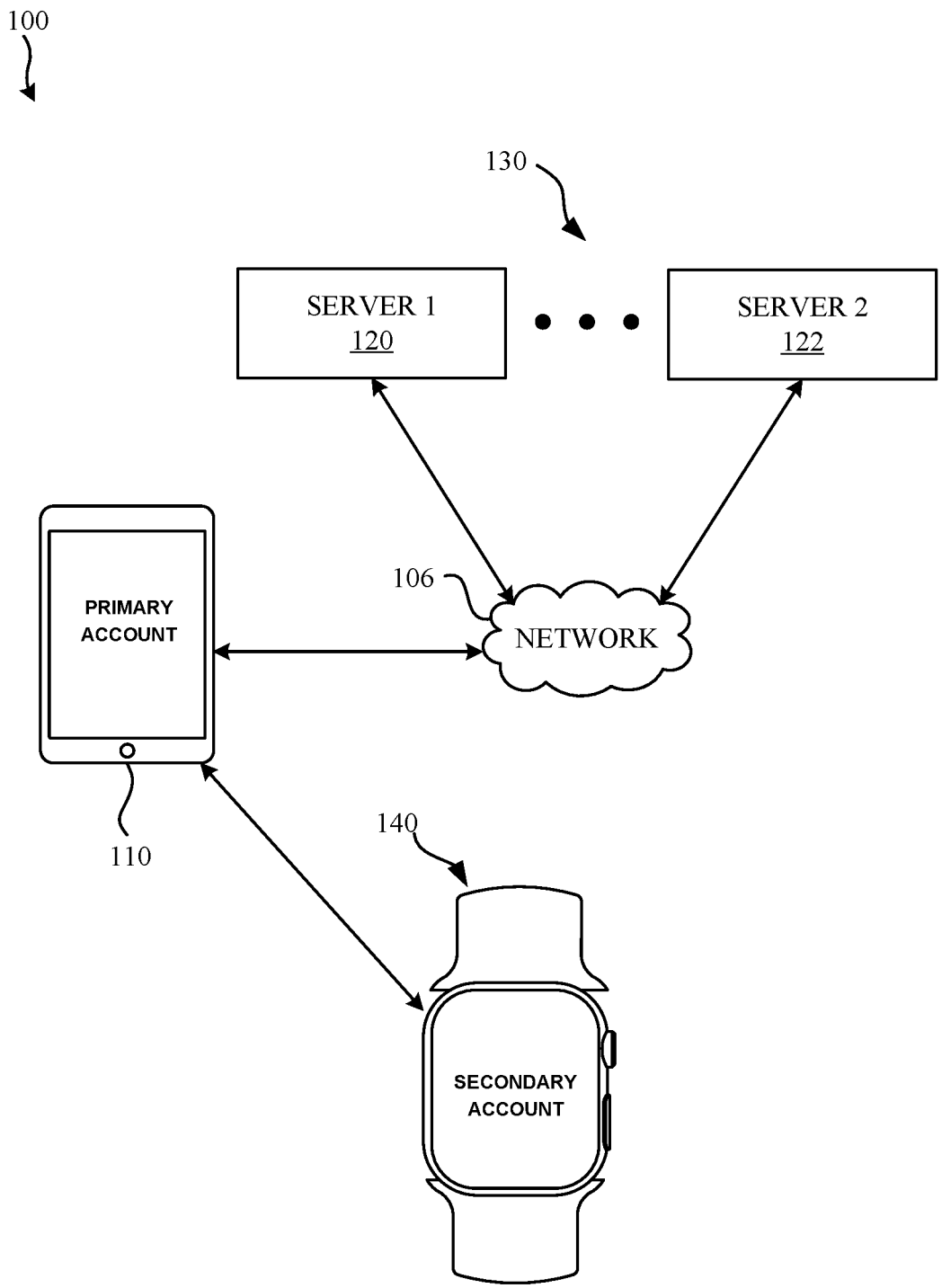

In some embodiments, the network environment 100 may include one or more other electronic devices, such as the electronic device 140, as is generally illustrated in FIG. 1B. The electronic device 140 may include a touchscreen and may be, for example, a portable computing device such as a laptop computer that includes a touchscreen, a smartphone that includes a touchscreen, a peripheral device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In one or more implementations, the electronic device 140 may not include a touchscreen but may support touchscreen-like gestures, such as in a virtual reality or augmented reality environment. In one or more implementations, the electronic device 140 may include a touchpad. In FIG. 1B, by way of example, the electronic device 140 is depicted as a wearable device, and in particular, as a watch, with a touchscreen. However, it should be understood that the electronic device 140 may include any suitable electronic device. Additionally, or alternatively, the network environment 100 may include any suitable number and/or type of electronic devices, other than those described herein. In one or more implementations, the electronic device 140 may be, and/or may include all or part of, the electronic system discussed below with respect to FIG. 6.

In some embodiments, the primary user may use the electronic device 110 to create a shared family account that may include the primary account and one or more secondary accounts. The one or more secondary accounts may use the electronic device 140, or other suitable electronic device, to access the respective secondary accounts. The shared family account may allow the primary account and/or the secondary accounts to share content (e.g., including music, videos, pictures, and the like), applications (e.g., including purchases, downloads, and the like), and/or other suitable information.

When the primary user creates a secondary account that corresponds to a child user, one or more identity verification techniques may be used to verify that the user attempting to create the account is the primary user. For example, the primary user may interact with a user account setup application on the electronic device 110 to create secondary accounts on the shared family account. The setup application may gather various information from the primary user regarding the secondary account, such as a user name associated with the secondary account, a user password (e.g., at least an initial password) associated with the secondary user account, an identity of the user associated with the secondary account, an age of the user associated with the secondary account, other suitable information, or a combination thereof. When the age of the user associated with the secondary account is at or below a threshold age (e.g., 13 years old or any suitable threshold age), the setup application may require the primary user to verify the identity of the primary user in order to proceed with the secondary account setup (e.g., to ensure that the primary user, typically an adult, such as a parent, guardian, and the like, is performing the account setup).

In addition to creating secondary accounts, the primary user may interact with the electronic device 110 to may monitor and/or manage actions taken by the secondary accounts during use of the electronic device 140 or other suitable electronic device. For example, the primary user may receive one or more notifications at the primary account on the electronic device 110, or other suitable electronic device associated with the primary account, requesting approval of an action taken by the secondary account on the electronic device 140. The action may include an application purchase and/or download, a content purchase and/or download, content access (e.g., such as video streaming, music streaming, online gaming, and the like), an action associated with an initial setup of the secondary account (e.g., as described), other suitable action, or a combination thereof. As described, when the age of the user associated with a secondary account is at or below the threshold age, the primary user may be required to provide verification of the identity of the primary user before allowing the primary user to approve an action associated with the secondary account (e.g., including the initial setup of the secondary account, an action taken by the secondary account, or other suitable action).

Figure 1C:
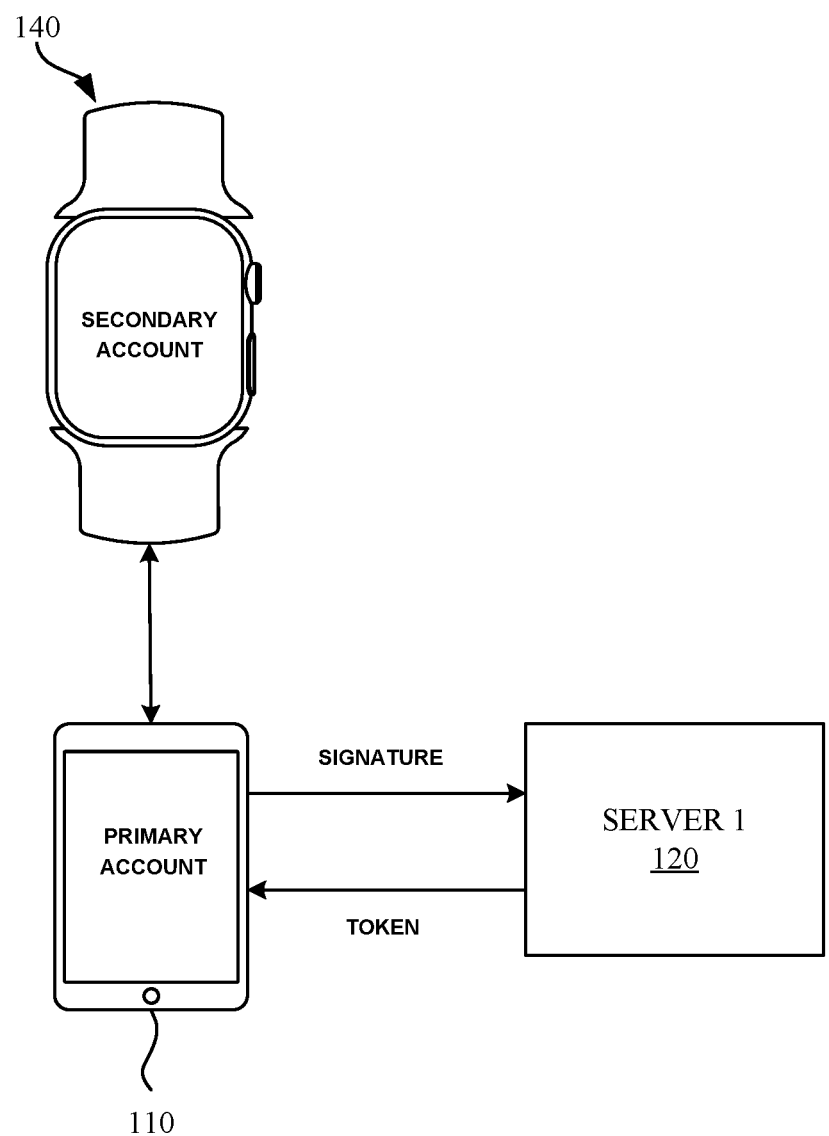
Figure 1D:
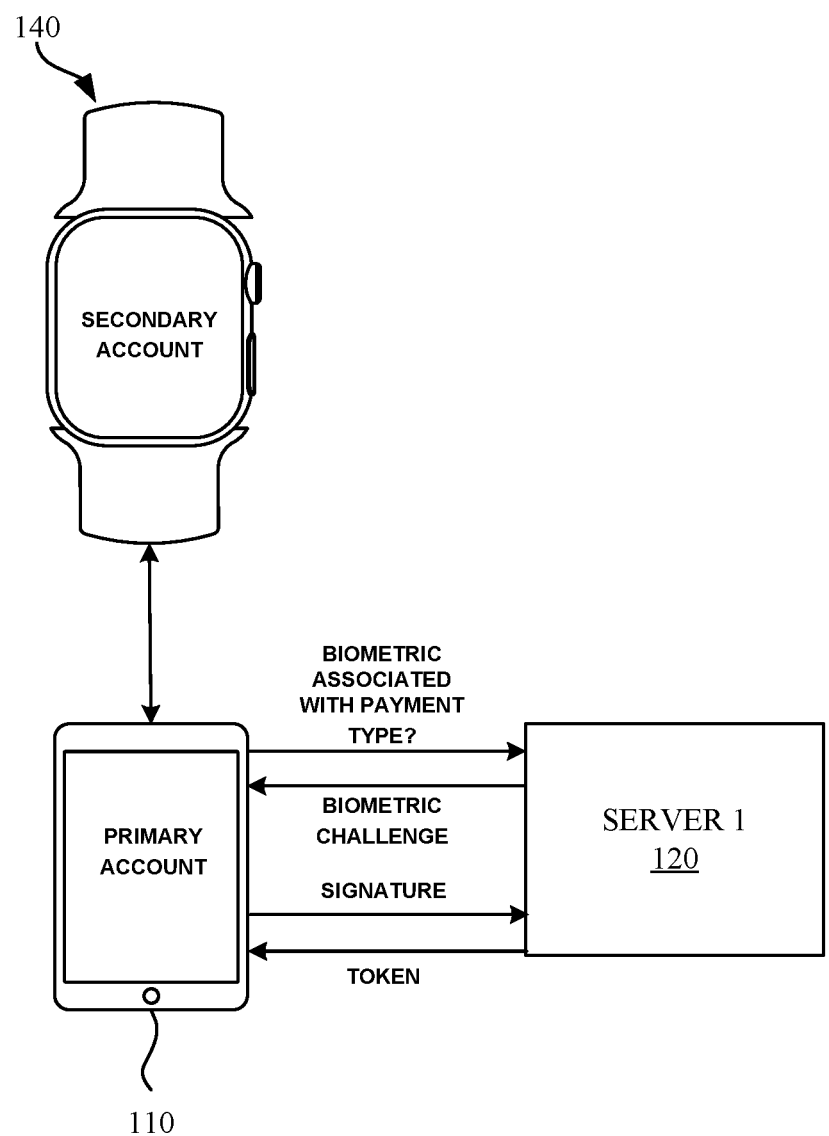
Figure 1E:
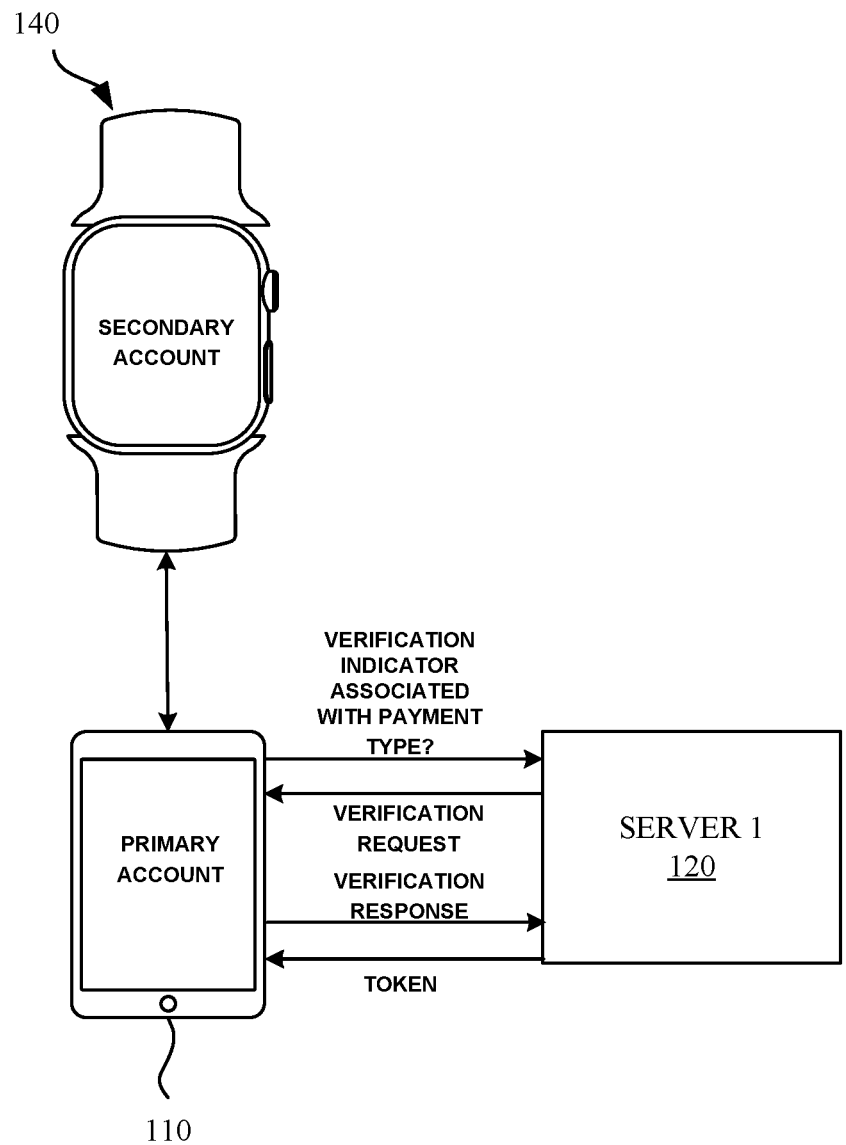

In some embodiments, the electronic device 110 may be configured to provide one or more identity verification techniques, as is generally illustrated in FIGS. 1C-1E. As described, the primary user may interact with the electronic device 110 to set up a secondary account on the shared family account. The secondary user may include a child or associated person at or below the threshold age. The secondary user may access the secondary account using the electronic device 140 or any other suitable device. In response to an action associated with the secondary account, such as during an initial setup of the secondary account and/or in response to another action taken by the secondary account, the primary account may receive, at the electronic device 110, a request for identity verification.

The electronic device 110 in response to the request for identity verification, identify a payment registration characteristic of a payment registration associated with the primary account. The payment registration may correspond to one of a plurality of payment registration types. The plurality of payment types may include a first payment type, a second payment type, a third payment type, or other suitable payment type. The first payment type may include a form of payment registration that includes credentials for at least one financial instrument stored on a virtual wallet of the electronic device 110. The second payment type may include a form of payment registration that includes credentials for at least one financial instrument stored on an application that is native to the electronic device 110 (e.g., such as a music player native to the electronic device 110, a video player native to the electronic device 110, or other suitable application native to the electronic device 110). The third payment type may include a form of payment registration that includes credentials for at least one financial instrument stored on an application that is not native to the electronic device 110 (e.g., such as a banking institution, an online shopping application, or other suitable application that is not native to the electronic device 110).

In some embodiments, the at least one payment registration characteristic may indicate one or more payment registration types that are associated with the primary account. The electronic device 110 may determine whether the at least one payment registration characteristic indicates that the primary account includes a first type of payment registration.

As is generally illustrated in FIG. 1C, if the electronic device 110 determines that the at least one payment registration characteristic indicates that the primary account includes a first type of payment registration, the electronic device 110 may retrieve identity information associated with the primary account. The identity information may be stored on the electronic device 110 and/or on the server 120. The identity information may include one or more biometric indicators corresponding to the primary user of the primary account. The one or more biometric indicators may include a facial recognition indicator, a fingerprint indicator, a retina indicator, and the like. The at least one biometric indicator may be used, by the primary user, to access a financial instrument stored in a digital wallet on the electronic device 110.

The electronic device 110 may generate a verification indicator. The verification indicator may include at least one biometric challenge. The at least one biometric challenge may include a facial recognition challenge, a fingerprint challenge, a retina scan challenge, other suitable biometric challenge, or a combination thereof. The electronic device 110 may present, in the application being used by the primary account on the electronic device 110, the at least one biometric challenge. The primary user may respond to the at least one biometric challenge, for example, by interacting with an image capturing device of the electronic device 110, a fingerprint reader, or other suitable mechanism for responding to the biometric challenge. The electronic device 110 may capture biometric information of the primary user, such as a facial scan, a fingerprint, a retina scan, or other suitable biometric information, in response to the primary user responding to the biometric challenge.

The electronic device 110 may compare the captured biometric information of the primary user to the retrieved identity information. If the electronic device 110 determines that the captured biometric information does not correspond to the retrieved identity information, the electronic device 110 may attempt the at least one biometric challenge again, provide an alternative biometric challenge, or determine that the identity of the primary user cannot be verified. The electronic device 110 may prevent the action associated with the secondary account from being taken.

Conversely, if the electronic device 110 determines that the captured biometric information corresponds to the retrieved identity information, the electronic device 110 verifies the identity of the primary user. The electronic device 110 generates a signature indicating that the identity of the primary user has been verified. The signature may include a text string or other suitable information indicating that the identity of the primary user has been verified. The electronic device 110 communicates the signature to the server 120.

As is generally illustrated in FIG. 1D, if the electronic device 110 determines that the payment registration characteristic indicates that the primary account does not include a first type of payment registration, the electronic device 110 determines whether the payment registration characteristic indicates that the primary account includes a second type of payment registration.

If the electronic device 110 determines that the payment registration characteristic indicates that the primary account includes a second type of payment registration, the electronic device 110 may retrieve identity information associated with the primary account. The identity information may be stored on the electronic device 110 and/or on the server 120. The identity information may include one or more biometric indicators corresponding to the primary user of the primary account. The one or more biometric indicators may include a facial recognition indicator, a fingerprint indicator, a retina indicator, and the like. The at least one biometric indicator may be used, by the primary user, to access financial instrument associated with an application that not native to the electronic device 110.

The electronic device 110 may request that the server 120 provide a verification indicator associated with the second type of payment registration. The server 120 may generate the verification indicator in response to the request from the electronic device 110. The verification indicator may include at least one biometric challenge. The at least one biometric challenge may include a facial recognition challenge, a fingerprint challenge, a retina scan challenge, other suitable biometric challenge, or a combination thereof.

The electronic device 110 may receive the verification indicator from the server 120. The electronic device 110 may present, in the application being used by the primary account on the electronic device 110, the at least one biometric challenge. The primary user may respond to the at least one biometric challenge, for example, by interacting with an image capturing device of the electronic device 110, a fingerprint reader, or other suitable mechanism for responding to the biometric challenge. The electronic device 110 may capture biometric information of the primary user, such as a facial scan, a fingerprint, a retina scan, or other suitable biometric information, in response to the primary user responding to the biometric challenge. The electronic device 110 may communicate the captured biometric information to the server 120.

The electronic device 110 may compare the captured biometric information of the primary user to the retrieved identity information. If the electronic device 110 determines that the captured biometric information does not correspond to the retrieved identity information, the electronic device 110 may attempt the at least one biometric challenge again, provide an alternative biometric challenge, or determine that the identity of the primary user cannot be verified. The electronic device 110 may prevent the action associated with the secondary account from being taken.

Conversely, if the electronic device 110 determines that the captured biometric information corresponds to the retrieved identity information, the electronic device 110 verifies the identity of the primary user. The electronic device 110 generates a signature indicating that the identity of the primary user has been verified. The signature may include a text string or other suitable information indicating that the identity of the primary user has been verified. The electronic device 110 communicates the signature to the server 120.

In some embodiments, the server 120 may receive the captured biometric information from the electronic device 110. The server 120 may compare the captured biometric information with identity information corresponding to the user stored on the server 120. If the server 120 determines that the captured biometric information corresponds to the identity information of the primary user, the server 120 may communicate a notification to the electronic device 110 indicating that the captured biometric information corresponds to the identity information of the primary user. The electronic device 110 may generate the signature in response to receiving the notification from the server 120.

Conversely, if the server 120 determines that the captured biometric information does not correspond to the identity information of the primary user, the server 120 may generate an alternative biometric challenge and communicate the alternative biometric challenge to the electronic device 110 Alternatively, the server 120 may communicate a notification to the electronic device 110 indicating that the captured biometric information does not correspond to the identity information of the primary user.

As is generally illustrated in FIG. 1E, if the electronic device 110 determines that the payment registration characteristic indicates that the primary account does not include a second type of payment registration, the electronic device 110 determines whether the payment registration characteristic indicates that the primary account includes a third type of payment registration. If the electronic device 110 determines that the payment registration characteristic indicates that the primary account includes a third type of payment registration, the electronic device 110 may request that the server 120 provide a verification indicator associated with the third type of payment registration. The server 120 may generate the verification indicator in response to the request from the electronic device 110.

The verification indicator may include at least one verification question. The at least one verification question may include a request for a credit card verification value code associated with the third type of payment registration, an answer to a security question set by the primary user, a text string or code (e.g., sent to an electronic mail account, a text messaging account, a short message service account, or other suitable account associated with the primary user), or other suitable information indicating associated with the third type of payment registration and/or the primary user.

The server 120 may retrieve identity information associated with the primary account in response to receiving the request from the electronic device 110. The identity information may include information corresponding to the primary user of the primary account, such as an account number, a user name, or other suitable information. The identity information may be used, by the primary user, to access financial instrument associated with an application that not native to the electronic device 110.

The electronic device 110 may receive the verification indicator from the server 120. The electronic device 110 may present, in the application being used by the primary account on the electronic device 110, the at least one verification question. The primary user may respond to the at least one verification question, for example, by interacting providing a credit card verification value code associated with the third type of payment registration, an answer to a security question set by the primary user, a text string or code (e.g., sent to an electronic mail account, a text messaging account, a short message service account, or other suitable account associated with the primary user), or other suitable information indicating associated with the third type of payment registration and/or the primary user. The electronic device 110 may capture the response to the at least one verification question. The electronic device 110 may communicate the response to the at least one verification question to the server 120.

The server 120 may compare the response to the at least one verification question to identity information corresponding to the primary user. If the server 120 determines that the response to the at least one verification question does not correspond to the retrieved identity information, the server 120 may request the electronic device 110 attempt the at least one verification question again, provide an alternative verification question, or determine that the identity of the primary user cannot be verified. Server 120 may communicate a notification to the electronic device 110 indicating that the identity of the primary user cannot be verified. The electronic device 110 may prevent the action associated with the secondary account from being taken.

Conversely, if the server 120 determines that the response to the at least one verification question corresponds to the retrieved identity information, the server 120 verifies the identity of the primary user. The server 120 may communicate a notification to the electronic device 110 indicating that the identity of the primary user has been identified. The electronic device 110 generates a signature indicating that the identity of the primary user has been verified. The signature may include a text string or other suitable information indicating that the identity of the primary user has been verified. The electronic device 110 communicates the signature to the server 120.

The server 120 may receive the signature indicating that the identity of the primary user has been verified by the electronic device 110. The server 120 generates a payment verification token (e.g., which may be referred to simply as the token) based on receiving the signature. The token may include a text string or other suitable information indicating that the server 120 has received the signature indicating that the identity of the primary user has been identified. The server 120 communicates the token to the electronic device 110.

In some embodiments, the electronic device 110 may verify that the token is an authentic token. For example, the electronic device 110 may communicate the received token to the server 120 requesting that the server 120 verify that the server 120 generated and communicated the token. The server 120 may be configured to compare the token received from the electronic device 110 with one or more tokens previously generated by the server 120. If the server 120 determines that the token received from the electronic device 110 corresponds to a token previously generated by the server 120, the server 120 communicates the token to the electronic device 110, indicating that the token is an authentic token.

The electronic device 110 may generate an authorization indication in response to receiving the token. The authorization indication may include a text string or other suitable information indicating that the identity of the primary user has been verified for the action associated with the secondary account. The primary user may then approve or deny the action associated with the secondary account, using the electronic device 110.

If the primary user denies the action, the electronic device 110 rejects the action associated with the secondary account. Conversely, if the primary user approves the action, the electronic device 110 continues with the action (e.g., by continuing a setup of the secondary account and/or by allowing the secondary account to continue to access content, download an application, make a purchase, and the like). The electronic device 110 may associate the token with the authorization indicator. The electronic device 110 may store the token, the authorization indicator, or both on the electronic device 110, on the server 120, and/or any suitable location. The token and/or authorization indicator may act as an indicator that the primary user approved the action associated with the secondary account.

Figure 2:
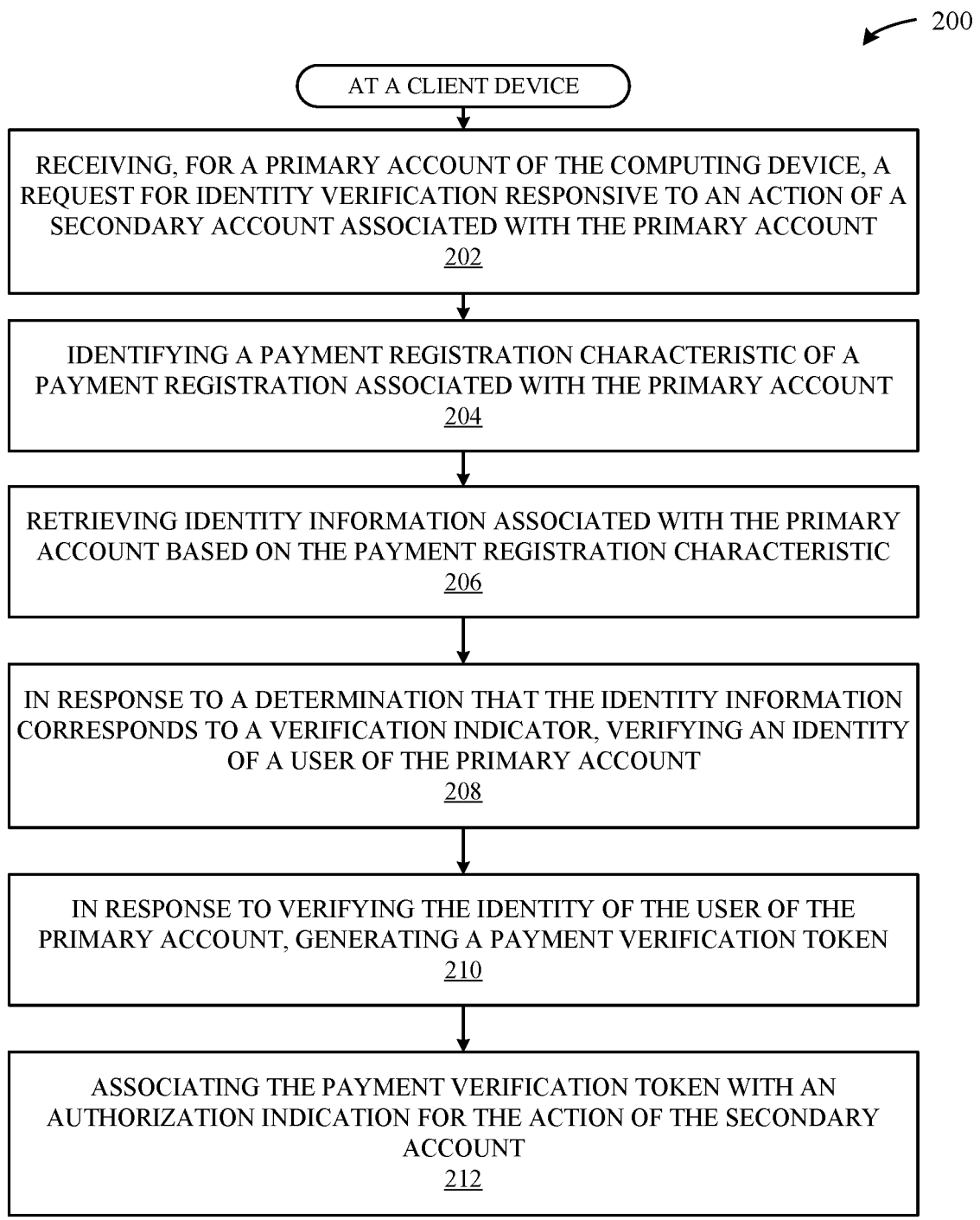
FIG. 2 illustrates an identity verification method, according to some embodiments.

FIG. 2 illustrates an identity verification method 200, according to some embodiments. As shown in FIG. 2, the method 200 begins at step 202, where a client device, such as the electronic device 110, receives, for a primary account, a request for identity verification responsive to an action of a secondary account associated with the primary account. The action may include an initial setup of the secondary account, a request by the secondary account for a user of the secondary account to purchase or access content using the secondary account, or other suitable action. The secondary account may be associated with and/or accessed on the electronic device 140 or any other suitable electronic device.

At step 204, the electronic device 110 identifies a payment registration characteristic of a payment registration associated with the primary account. At step 206, the electronic device 110 retrieves identity information associated with the primary account based on the payment registration characteristic. At step 208, in response to a determination that the identity information corresponds to a verification indicator, the electronic device 110 verifies an identity of a user of the primary account.

At step 210, in response to verifying the identity of the user of the primary account, the server 120 generates a payment verification token. At step 212, the electronic device 110 and/or the server 120 associates the payment verification token with n authorization indication for the action of the secondary account.

Figure 3:
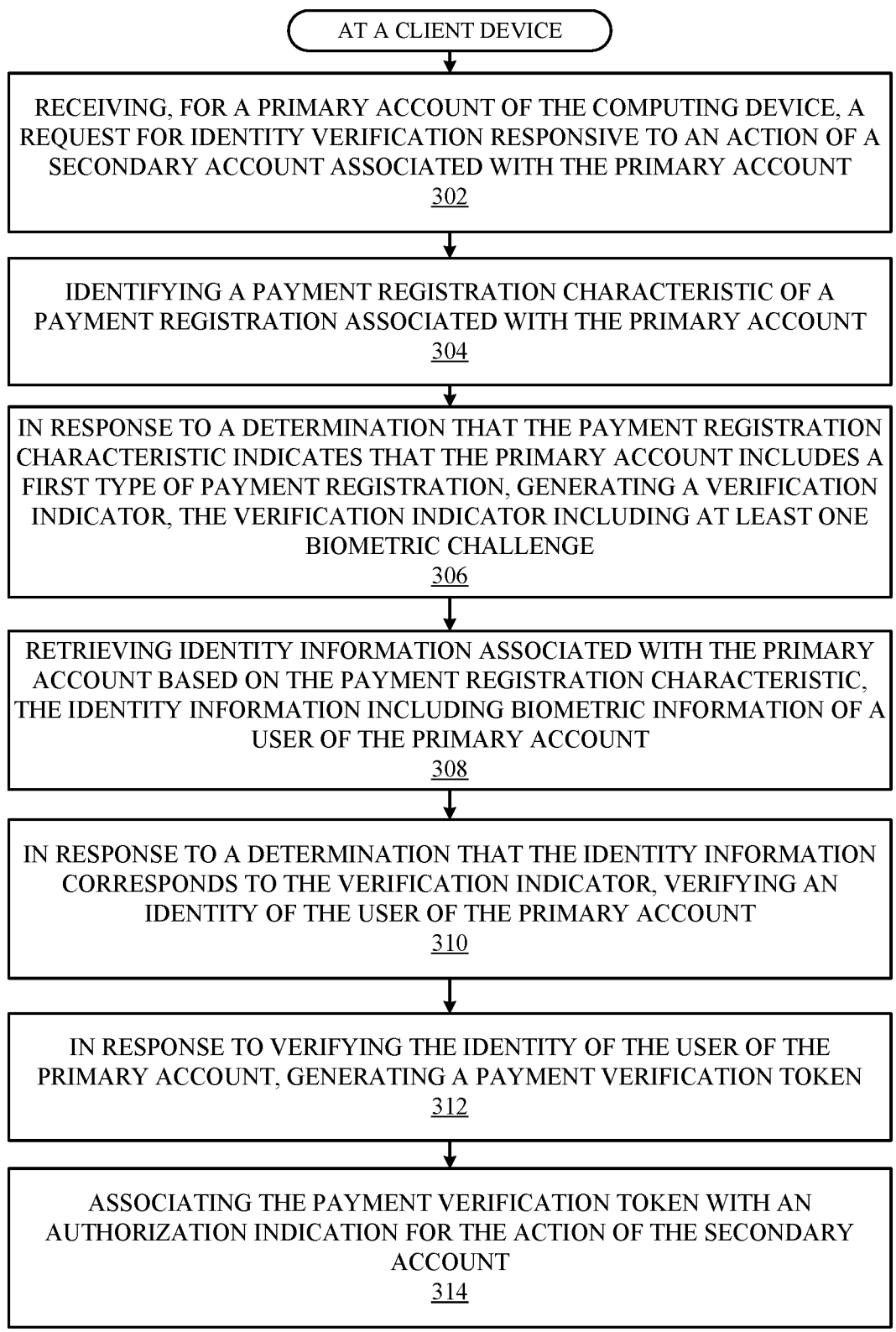
FIG. 3 illustrates an alternative identity verification method, according to some embodiments.

FIG. 3 illustrates an alternative identity verification method 300, according to some embodiments. As shown in FIG. 3, the method 300 begins at step 302, where a client device, such as the electronic device 110, receives, for a primary account, a request for identity verification responsive to an action of a secondary account associated with the primary account. The action may include an initial setup of the secondary account, a request by the secondary account for a user of the secondary account to purchase or access content using the secondary account, or other suitable action. The secondary account may be associated with and/or accessed on the electronic device 140 or any other suitable electronic device.

At step 304, the electronic device 110 identifies a payment registration characteristic of a payment registration associated with the primary account. At step 306, in response to a determination that the payment registration characteristic indicates that the primary account includes a first type of payment registration, the electronic device 110 generates a verification indicator. The verification indicator may include at least one biometric challenge. At step 308, the electronic device 110 retrieves identity information associated with the primary account based on the payment registration characteristic. The identity information may include biometric information of a user of the primary account.

At step 310, in response to a determination that the identity information corresponds to a verification indicator, the electronic device 110 verifies an identity of a user of the primary account. At step 312, in response to verifying the identity of the user of the primary account, the server 120 generates a payment verification token. At step 314, the electronic device 110 and/or the server 120 associates the payment verification token with n authorization indication for the action of the secondary account.

Figure 4:
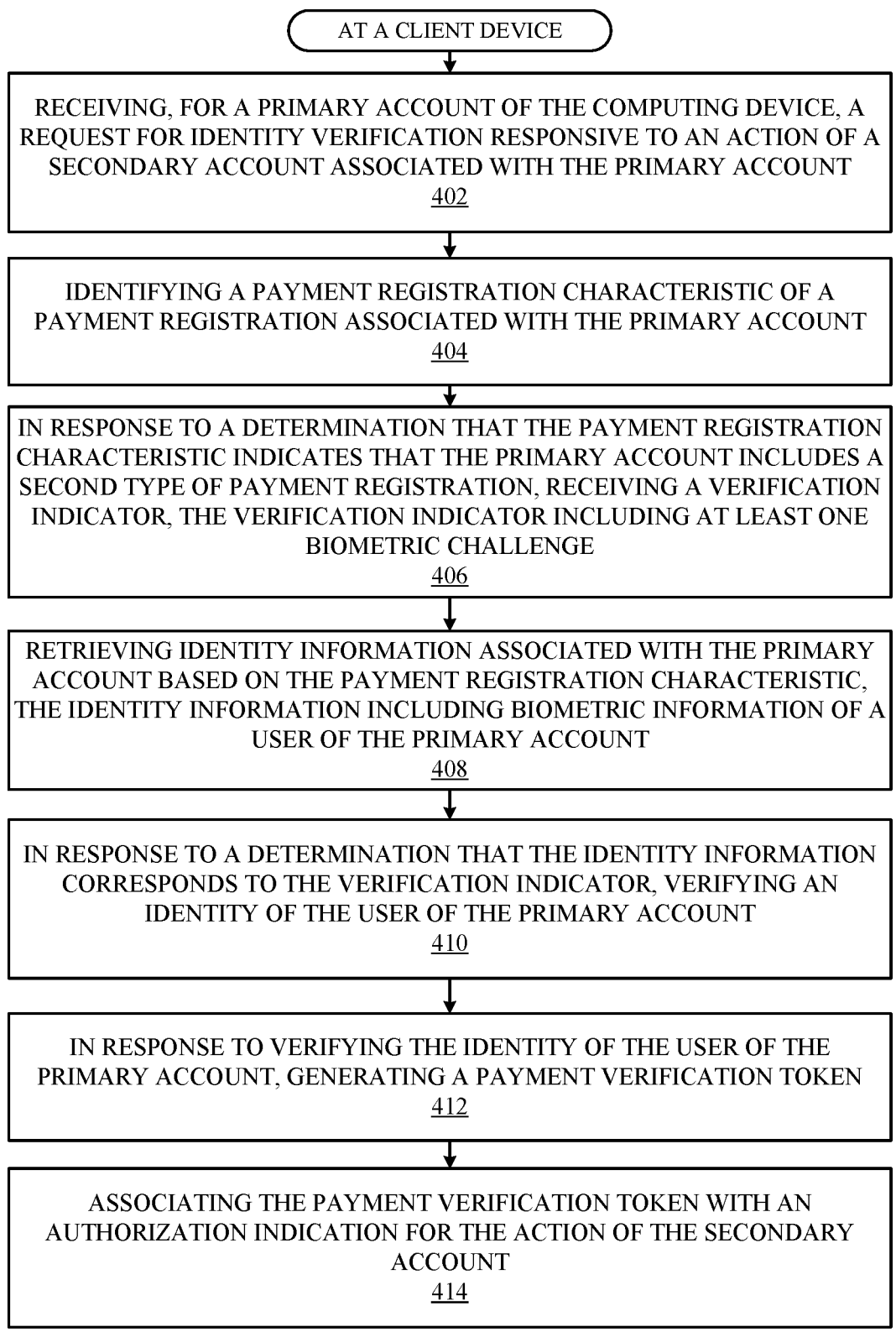
FIG. 4 illustrates an alternative identity verification method, according to some embodiments.

FIG. 4 illustrates an alternative identity verification method 400, according to some embodiments. As shown in FIG. 4, the method 400 begins at step 402, where a client device, such as the electronic device 110, receives, for a primary account, a request for identity verification responsive to an action of a secondary account associated with the primary account. The action may include an initial setup of the secondary account, a request by the secondary account for a user of the secondary account to purchase or access content using the secondary account, or other suitable action. The secondary account may be associated with and/or accessed on the electronic device 140 or any other suitable electronic device.

At step 404, the electronic device 110 identifies a payment registration characteristic of a payment registration associated with the primary account. At step 406, in response to a determination that the payment registration characteristic indicates that the primary account includes a second type of payment registration, the electronic device 110 receives, from the server 120, a verification indicator. The verification indicator may include at least one biometric challenge. At step 408, the electronic device 110 retrieves identity information associated with the primary account based on the payment registration characteristic. The identity information may include biometric information of a user of the primary account.

At step 410, in response to a determination that the identity information corresponds to a verification indicator, the electronic device 110 verifies an identity of a user of the primary account. At step 412, in response to verifying the identity of the user of the primary account, the server 120 generates a payment verification token. At step 414, the electronic device 110 and/or the server 120 associates the payment verification token with n authorization indication for the action of the secondary account.

Figure 5:
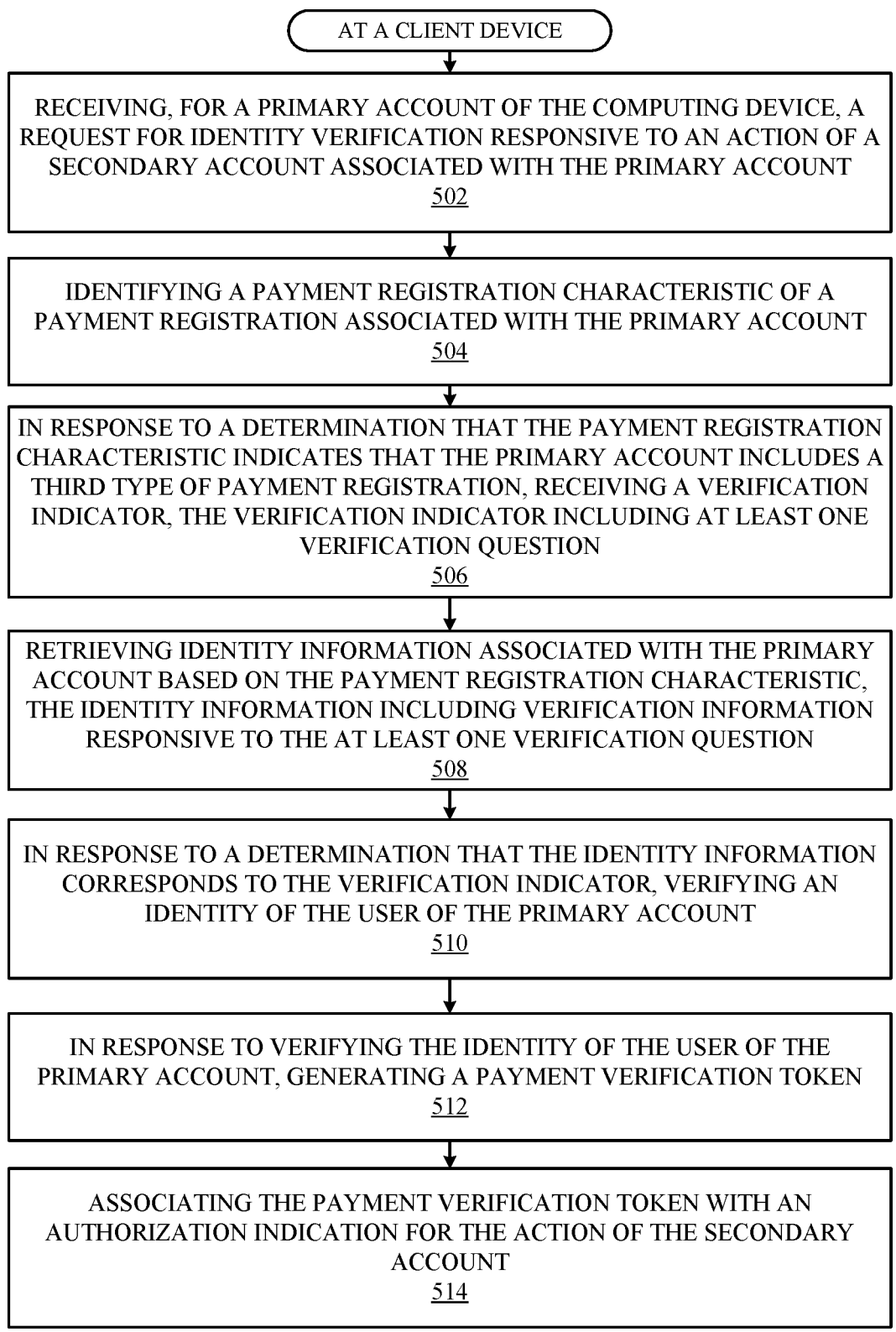
FIG. 5 illustrates an alternative identity verification method, according to some embodiments.

FIG. 5 illustrates an alternative identity verification method 500, according to some embodiments. As shown in FIG. 5, the method 500 begins at step 502, where a client device, such as the electronic device 110, receives, for a primary account, a request for identity verification responsive to an action of a secondary account associated with the primary account. The action may include an initial setup of the secondary account, a request by the secondary account for a user of the secondary account to purchase or access content using the secondary account, or other suitable action. The secondary account may be associated with and/or accessed on the electronic device 140 or any other suitable electronic device.

At step 504, the electronic device 110 identifies a payment registration characteristic of a payment registration associated with the primary account. At step 506, in response to a determination that the payment registration characteristic indicates that the primary account includes a third type of payment registration, the electronic device 110 receives, from the server 120 or other suitable server, a verification indicator. The verification indicator including at least one verification question. At step 508, the electronic device 110 retrieves identity information associated with the primary account based on the payment registration characteristic. The identity information may include verification information responsive to the at least one verification question.

At step 510, in response to a determination that the identity information corresponds to a verification indicator, the electronic device 110 verifies an identity of a user of the primary account. At step 512, in response to verifying the identity of the user of the primary account, the server 120 generates a payment verification token. At step 514, the electronic device 110 and/or the server 120 associates the payment verification token with n authorization indication for the action of the secondary account.

Figure 6:
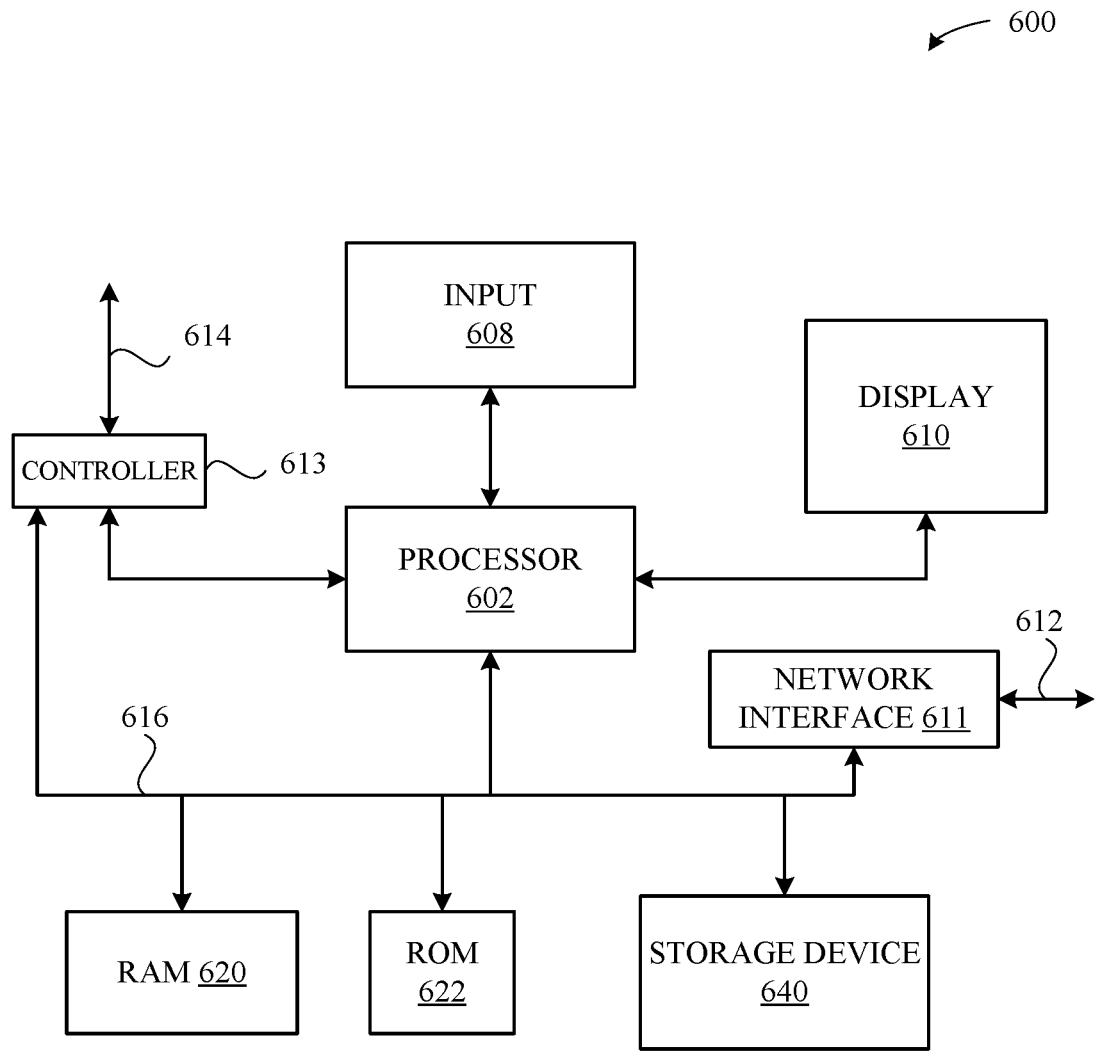
FIG. 6 illustrates a detailed view of a computing device that can represent the electronic device of FIGS. 1A-1E used to implement the various techniques described herein, according to some embodiments.

FIG. 6 illustrates a detailed view of a computing device 600 that can be used to implement the various components described herein, according to some embodiments. In particular, the detailed view illustrates various components that can be included in the electronic device 110 and/or the electronic device 140 illustrated in FIGS. 1A-1E. As shown in FIG. 6, the computing device 600 can include a processor 602 that represents a microprocessor or controller for controlling the overall operation of computing device 600.

The computing device 600 can also include a user input device 608 that allows a user of the computing device 600 to interact with the computing device 600. For example, the user input device 608 can take a variety of forms, such as a button, keypad, dial, touch screen, audio input interface, visual/image capture input interface, input in the form of sensor data, etc. Still further, the computing device 600 can include a display 610 (screen display) that can be controlled by the processor 602 to display information to the user. A data bus 616 can facilitate data transfer between at least a storage device 640, the processor 602, and a controller 613. The controller 613 can be used to interface with and control different equipment through and equipment control bus 614. The computing device 600 can also include a network/bus interface 611 that couples to a data link 612. In the case of a wireless connection, the network/bus interface 611 can include a wireless transceiver.

The computing device 600 also includes a storage device 640, which can comprise a single disk or a plurality of disks (e.g., hard drives), and includes a storage management module that manages one or more partitions within the storage device 640. In some embodiments, storage device 640 can include flash memory, semiconductor (solid state) memory or the like. The computing device 600 can also include a Random Access Memory (RAM) 420 and a Read-Only Memory (ROM) 622. The ROM 622 can store programs, utilities, or processes to be executed in a non-volatile manner. The RAM 620 can provide volatile data storage, and stores instructions related to the operation of the computing device 600.

In some embodiments, a method for providing identity verification includes, at a client device receiving, for a primary account associated with the client device, a request for identity verification responsive to an action of a secondary account associated with the primary account and identifying a payment registration characteristic of a payment registration associated with the primary account. The method also includes retrieving identity information associated with the primary account based on the payment registration characteristic and, in response to a determination that the identity information corresponds to a verification indicator, verifying an identity of a user of the primary account. The method also includes, in response to verifying the identity of the user of the primary account, generating a payment verification token, and associating the payment verification token with an authorization indication for the action of the secondary account.

In some embodiments, the method also includes determining a payment registration type based on the payment registration characteristic. In some embodiments, the method also includes, in response to the payment registration characteristic indicating that the primary account includes a first type of payment registration, generating the verification indicator. In some embodiments, the verification indicator includes at least one biometric challenge and the identity information includes a biometric information. In some embodiments, the method also includes, in response to the payment registration characteristic indicating that the primary account includes a second type of payment registration, receiving, from a server associated the payment registration, the verification indicator. In some embodiments, the verification indicator includes at least one biometric challenge and the identity information includes a biometric information. In some embodiments, the method also includes, in response to the payment registration characteristic indicating that the primary account includes a third type of payment registration, receiving, from a server associated the payment registration, the verification indicator. In some embodiments, the verification indicator includes at least one verification question and the identity information includes a verification information responsive to the verification question.

In some embodiments, at least one non-transitory computer readable storage medium configured to store instructions that, when executed by at least one processor included in a client device, cause the client device to verify a user identity, by carrying out steps that include: receiving, for a primary account associated with the client device, a request for identity verification responsive to an action of a secondary account associated with the primary account; identifying a payment registration characteristic of a payment registration associated with the primary account; retrieving identity information associated with the primary account based on the payment registration characteristic; in response to a determination that the identity information corresponds to a verification indicator, verifying an identity of a user of the primary account; in response to verifying the identity of the user of the primary account, generating a payment verification token; and associating the payment verification token with an authorization indication for the action of the secondary account.

In some embodiments, the steps further include determining a payment registration type based on the payment registration characteristic. In some embodiments, the steps further include, in response to the payment registration characteristic indicating that the primary account includes a first type of payment registration, generating the verification indicator. In some embodiments, the verification indicator includes at least one biometric challenge and the identity information includes a biometric information. In some embodiments, the steps further include, in response to the payment registration characteristic indicating that the primary account includes a second type of payment registration, receiving, from a server associated the payment registration, the verification indicator. In some embodiments, the verification indicator includes at least one biometric challenge and the identity information includes a biometric information. In some embodiments, the steps further include, in response to the payment registration characteristic indicating that the primary account includes a third type of payment registration, receiving, from a server associated the payment registration, the verification indicator. In some embodiments, the verification indicator includes at least one verification question and the identity information includes a verification information responsive to the verification question.

In some embodiments, a client device configured to verify a user identity includes at least one processor and at least one memory storing instructions that, when executed by the at least one processor, cause the client device to perform steps that include: receiving, for a primary account associated with the client device, a request for identity verification responsive to an action of a secondary account associated with the primary account; identifying a payment registration characteristic of a payment registration associated with the primary account; retrieving identity information associated with the primary account based on the payment registration characteristic; in response to a determination that the identity information corresponds to a verification indicator, verifying an identity of a user of the primary account; in response to verifying the identity of the user of the primary account, generating a payment verification token; and associating the payment verification token with an authorization indication for the action of the secondary account.

In some embodiments, the primary account and the secondary account belong to a shared account. In some embodiments, the secondary account is associated with another client device. In some embodiments, the action of the secondary account includes one of setting up the secondary account and accessing content by the secondary account.

The various aspects, embodiments, implementations, or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data, which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for enabling a primary computing device to authorize actions requested by secondary computing devices, the method comprising, by the primary computing device:
   receiving, from a secondary computing device, a request to perform an action, wherein:
      primary and secondary accounts are associated with the primary and secondary computing devices, respectively,
      the primary and secondary accounts are associated as a shared user account, and the secondary account is unable to access a set of actions that the primary account is permitted to access, wherein the set of actions includes the action;

identifying a payment registration characteristic of a payment registration associated with the primary account;

obtaining, based on the payment registration characteristic, identity information associated with the primary account;

identifying, based on the payment registration characteristic, a particular identity verification technique through which to obtain a verification indicator;

performing the particular identity verification technique to obtain the verification indicator; and in conjunction with determining that the identity information corresponds to the verification indicator:
providing, to a server computing device, an indication that the identity information corresponds to the verification indicator,
receiving, from the server computing device, a payment verification token that authorizes the action requested by the secondary account, and
authorizing the action requested by the secondary account.

2. The method of claim 1, further comprising:
determining a payment registration type based on the payment registration characteristic.

3. The method of claim 2, further comprising:
in response to the payment registration characteristic indicating that the primary account includes a first type of payment registration, generating the verification indicator.

4. The method of claim 3, wherein the verification indicator includes at least one biometric challenge and wherein the identity information includes biometric information.

5. The method of claim 2, further comprising:
in response to the payment registration characteristic indicating that the primary account includes a second type of payment registration, receiving, from the server computing device, the verification indicator.

6. The method of claim 5, wherein the verification indicator includes at least one biometric challenge and wherein the identity information includes biometric information.

7. The method of claim 2, further comprising:
in response to the payment registration characteristic indicating that the primary account includes a second type of payment registration, receiving, from the server computing device, the verification indicator.

8. The method of claim 7, wherein the verification indicator includes at least one verification question and wherein the identity information includes verification information responsive to the at least one verification question.

9. At least one non-transitory computer readable storage medium configured to store instructions that, when executed by at least one processor included in a primary computing device, cause the primary computing device to authorize actions requested by secondary computing devices, by carrying out steps that include:
receiving, from a secondary computing device, a request to perform an action, wherein:
primary and secondary accounts are associated with the primary and secondary computing devices, respectively,
the primary and secondary accounts are associated as a shared user account, and
the secondary account is unable to access a set of actions that the primary account is permitted to access, wherein the set of actions includes the action;

identifying a payment registration characteristic of a payment registration associated with the primary account;

obtaining, based on the payment registration characteristic, identity information associated with the primary account;

identifying, based on the payment registration characteristic, a particular identity verification technique through which to obtain a verification indicator;

performing the particular identity verification technique to obtain the verification indicator; and in conjunction with determining that the identity information corresponds to the verification indicator:
providing, to a server computing device, an indication that the identity information corresponds to the verification indicator,
receiving, from the server computing device, a payment verification token that authorizes the action requested by the secondary account, and
authorizing the action requested by the secondary account.

10. The at least one non-transitory computer readable storage medium of claim 9, wherein the steps further include determining a payment registration type based on the payment registration characteristic.

11. The at least one non-transitory computer readable storage medium of claim 10, wherein the steps further include:
in response to the payment registration characteristic indicating that the primary account includes a first type of payment registration, generating the verification indicator.

12. The at least one non-transitory computer readable storage medium of claim 11, wherein the verification indicator includes at least one biometric challenge and wherein the identity information includes biometric information.

13. The at least one non-transitory computer readable storage medium of claim 10, wherein the steps further include:
in response to the payment registration characteristic indicating that the primary account includes a second type of payment registration, receiving, from the server computing device, the verification indicator.

14. The at least one non-transitory computer readable storage medium of claim 13, wherein the verification indicator includes at least one biometric challenge and wherein the identity information includes biometric information.

15. The at least one non-transitory computer readable storage medium of claim 10, wherein the steps further include:
in response to the payment registration characteristic indicating that the primary account includes a second type of payment registration, receiving, from the server computing device, the verification indicator.

16. The at least one non-transitory computer readable storage medium of claim 15, wherein the verification indicator includes at least one verification question and wherein the identity information includes a verification information responsive to the at least one verification question.

17. A primary computing device configured to authorize actions requested by secondary computing devices, the primary computing device comprising:
at least one processor; and at least one memory storing instructions that, when executed by the at least one processor, cause the primary computing device to carry out steps that include:
- receiving, from a secondary computing device, a request to perform an action, wherein:
  - primary and secondary accounts are associated with the primary and secondary computing devices, respectively,
  - the primary and secondary accounts are associated as a shared user account, and
  - the secondary account is unable to access a set of actions that the primary account is permitted to access, wherein the set of actions includes the action;
- identifying a payment registration characteristic of a payment registration associated with the primary account;
- obtaining, based on the payment registration characteristic, identity information associated with the primary account;
- identifying, based on the payment registration characteristic, a particular identity verification technique through which to obtain a verification indicator;
- performing the particular identity verification technique to obtain the verification indicator; and
- in conjunction with determining that the identity information corresponds to the verification indicator:
  - providing, to a server computing device, an indication that the identity information corresponds to the verification indicator,
  - receiving, from the server computing device, a payment verification token that authorizes the action requested by the secondary account, and
  - authorizing the action requested by the secondary account.

18. The primary computing device of claim 17, wherein the shared user account comprises a family account to which the first and second computing devices are linked.

19. The primary computing device of claim 17, wherein the secondary account is associated with another primary computing device.

20. The primary computing device of claim 17, wherein the action of the secondary account includes one of setting up the secondary account and accessing content by the secondary account.

* * * * *